US011238508B2

(12) United States Patent
Ruvini

(10) Patent No.: US 11,238,508 B2
(45) Date of Patent: Feb. 1, 2022

(54) CONVERSATIONAL ASSISTANT USING EXTRACTED GUIDANCE KNOWLEDGE

(71) Applicant: eBay Inc., San Jose, CA (US)

(72) Inventor: Jean-David Ruvini, Campbell, CA (US)

(73) Assignee: eBay Inc., San Jose, CA (US)

(*) Notice: Subject to any disclaimer, the term of this patent is extended or adjusted under 35 U.S.C. 154(b) by 171 days.

(21) Appl. No.: 16/109,658

(22) Filed: Aug. 22, 2018

(65) Prior Publication Data

US 2020/0065873 A1 Feb. 27, 2020

(51) Int. Cl.
*G06F 40/30* (2020.01)
*G06F 16/338* (2019.01)
(Continued)

(52) U.S. Cl.
CPC ......... *G06Q 30/0613* (2013.01); *G06F 16/31* (2019.01); *G06F 16/338* (2019.01);
(Continued)

(58) Field of Classification Search
CPC .............. G10L 15/1815; G10L 15/22; G10L 2015/228; G10L 15/18; G06Q 30/0627;
(Continued)

(56) References Cited

U.S. PATENT DOCUMENTS 5,566,291 A 10/1996 Boulton et al.
7,418,447 B2* 8/2008 Caldwell ............... G06Q 30/02
705/26.1
(Continued)

FOREIGN PATENT DOCUMENTS

WO 2014/033799 A1 3/2014
WO 2015/077398 A9 7/2015
(Continued)

OTHER PUBLICATIONS

D'Aniello, Giuseppe, et al. "A dialogue-based approach enhanced with situation awareness and reinforcement learning for ubiquitous access to linked data." 2014 International Conference on Intelligent Networking and Collaborative Systems. IEEE, Sep. 2014, 249-256. (Year: 2014).*
(Continued)

*Primary Examiner* — Martin Lerner
(74) *Attorney, Agent, or Firm* — Holland & Hart LLP

(57) ABSTRACT

Systems and methods for improving an information provisioning system using a natural language conversational assistant is provided. A machine agent initiates an interactive natural language conversation with a user to provide the user with guidance on one or more products. The machine agent receives a request for information from the user, and accesses, from a product knowledge database, textual statements about features of the one or more products, whereby the textual statements are obtained by a machine-based offline knowledge extraction process that extracts the textual statements from reviews or product guides. Based on the accessed textual statements and an overall empirical utility of each of the accessed textual statements, the machine agent determines one or more statements of the accessed textual statements to convey to the user. The machine agent causes presentation of the one or more statements to the user.

20 Claims, 6 Drawing Sheets

(51) Int. Cl.
*G06Q 30/06* (2012.01)
*G06F 16/31* (2019.01)
*G06F 16/332* (2019.01)
*G06F 16/33* (2019.01)

(52) U.S. Cl.
CPC ...... *G06F 16/3329* (2019.01); *G06F 16/3344* (2019.01); *G06F 40/30* (2020.01)

(58) Field of Classification Search
CPC ............ G06Q 30/0629; G06Q 30/0631; G06F 40/30; G06F 16/338; G06F 16/3329; G06F 16/3344; G06F 40/20; G06F 40/279
USPC ............... 704/9, 257, 270; 705/26.62, 26.63, 705/26.64, 26.7; 707/722
See application file for complete search history.

(56) References Cited

U.S. PATENT DOCUMENTS

| | | | |
|---|---|---|---|
| 7,937,391 | B2 | 5/2011 | Chea et al. |
| 8,731,995 | B2* | 5/2014 | Sun .................... G06Q 30/0203 704/9 |
| 9,129,008 | B1* | 9/2015 | Kuznetsov ............ G06F 16/435 |
| 9,318,108 | B2 | 4/2016 | Gruber et al. |
| 9,904,949 | B1* | 2/2018 | Tavernier ........... G06Q 30/0631 |
| 10,061,767 | B1* | 8/2018 | Mengle ................. G06F 40/295 |
| 10,438,264 | B1* | 10/2019 | Viswanathan ........ G06F 16/252 |
| 2002/0095411 | A1* | 7/2002 | Caldwell ................ G06F 40/56 |
| 2002/0143550 | A1* | 10/2002 | Nakatsuyama ........ G06Q 30/06 704/270.1 |
| 2003/0202017 | A1* | 10/2003 | Fukuoka ................ G06Q 30/06 715/809 |
| 2004/0006478 | A1* | 1/2004 | Alpdemir ............... G06Q 30/02 704/275 |
| 2005/0234727 | A1* | 10/2005 | Chiu .................... H04M 3/4938 704/270.1 |
| 2007/0294127 | A1 | 12/2007 | Zivov |
| 2008/0133426 | A1* | 6/2008 | Porat .................. G06Q 30/0601 705/80 |
| 2008/0249775 | A1* | 10/2008 | Chiu ........................ G10L 15/22 704/257 |
| 2009/0282019 | A1* | 11/2009 | Galitsky ............... G06F 40/279 |
| 2010/0306080 | A1 | 12/2010 | Trandal et al. |
| 2011/0320373 | A1* | 12/2011 | Lee ......................... H04L 67/14 715/758 |
| 2012/0221502 | A1* | 8/2012 | Jerram ................... G06Q 30/02 706/46 |
| 2013/0179794 | A1* | 7/2013 | Eastham ............... H04L 67/025 715/738 |
| 2013/0275164 | A1* | 10/2013 | Gruber .................... G10L 17/22 705/5 |
| 2014/0032368 | A1* | 1/2014 | Nguyen ............. G06Q 30/0603 705/26.63 |
| 2014/0129292 | A1* | 5/2014 | Ruvini ............... G06Q 30/0282 705/7.34 |
| 2014/0164123 | A1* | 6/2014 | Wissner-Gross ........................... G06Q 30/0623 705/26.61 |
| 2014/0200879 | A1* | 7/2014 | Sakhai .................... G06Q 50/12 704/9 |
| 2015/0052115 | A1* | 2/2015 | Sharifi .................. G06F 16/685 707/722 |
| 2015/0073907 | A1* | 3/2015 | Purves ................... G06Q 20/32 705/14.58 |
| 2015/0310464 | A1 | 10/2015 | Evans et al. |
| 2016/0154862 | A1* | 6/2016 | Gabbai ................. G06F 3/0488 707/722 |
| 2016/0189265 | A1* | 6/2016 | Carbonell ............ G06F 40/174 705/26.41 |
| 2016/0267377 | A1* | 9/2016 | Pan ........................ G06F 40/30 |
| 2016/0283997 | A1 | 9/2016 | Zhang |
| 2016/0342317 | A1* | 11/2016 | Lim ........................ G10L 15/22 |
| 2016/0350664 | A1* | 12/2016 | Devarajan ............. G06Q 50/01 |
| 2017/0061283 | A1* | 3/2017 | Rasmussen .......... G06N 3/0454 |
| 2017/0091816 | A1* | 3/2017 | Moreau ............. G06Q 30/0277 |
| 2017/0160813 | A1* | 6/2017 | Divakaran ............. G06F 3/017 |
| 2017/0213138 | A1* | 7/2017 | Bojja ..................... G06N 20/00 |
| 2017/0243134 | A1* | 8/2017 | Housman ............... G06F 40/30 |
| 2017/0249389 | A1 | 8/2017 | Brovinsky et al. |
| 2018/0039633 | A1* | 2/2018 | Miyoshi ................. G06F 40/247 |
| 2018/0052822 | A1* | 2/2018 | Lei ........................ G06F 40/30 |
| 2018/0165745 | A1* | 6/2018 | Zhu ....................... G06Q 30/02 |
| 2018/0210957 | A1* | 7/2018 | Altaf ................... G06F 16/9535 |
| 2018/0226076 | A1 | 8/2018 | Kotti et al. |
| 2018/0260860 | A1* | 9/2018 | Devanathan .......... G06F 16/345 |
| 2018/0261223 | A1* | 9/2018 | Jain ......................... G06F 40/35 |
| 2018/0367668 | A1* | 12/2018 | Balzer ................. H04M 3/4936 |
| 2019/0005570 | A1* | 1/2019 | Goodman ............. G10L 15/26 |
| 2019/0012714 | A1* | 1/2019 | Bright ................ G06Q 30/0617 |
| 2019/0019233 | A1* | 1/2019 | Bhowmick ........... H04L 67/306 |
| 2019/0043493 | A1* | 2/2019 | Mohajer ............. G10L 15/1822 |
| 2019/0095973 | A1* | 3/2019 | Byron .................. G06F 40/47 |
| 2019/0325498 | A1* | 10/2019 | Clark ..................... G06T 19/006 |
| 2019/0333118 | A1* | 10/2019 | Crimmins ............... G06F 40/30 |
| 2019/0353379 | A1* | 11/2019 | Lee .......................... F24F 11/62 |

FOREIGN PATENT DOCUMENTS

| | | |
|---|---|---|
| WO | 2017/041008 A1 | 3/2017 |
| WO | 2017/112813 A1 | 6/2017 |
| WO | 2020/040883 A1 | 2/2020 |

OTHER PUBLICATIONS

International Search report received for PCT Application No. PCT/US2019/040268, dated Nov. 1, 2019, 4 pages.

International Written Opinion received for PCT Application No. PCT/US2019/040268, dated Nov. 1, 2019, 8 pages.

International Preliminary Report on Patentability received for PCT Application No. PCT/US2019/040268, dated Mar. 4, 2021, 10 Pages.

* cited by examiner

CONVERSATIONAL ASSISTANT USING EXTRACTED GUIDANCE KNOWLEDGE

TECHNICAL FIELD

The subject matter disclosed herein generally relates to special-purpose machines configured to the technical field of providing information through a conversational assistant, and to the technologies by which such special-purpose machines become improved compared to other machines that provide information. Specifically, the present disclosure addresses systems and methods to provide natural language conversational assistances using extracted guidance knowledge.

BACKGROUND

Conventionally, a customer expects a salesperson in brick and mortar store to provide them with a description of products and information to make an informed purchase (e.g., strengths and weaknesses of a product, how two products compare). While shopbots and speech-based shopping assistants are gaining popularity, providing end-users with a truly conversational experience is a technical challenge. In reality, most existing shopbots rely on scripted conversations, and are not capable of answering questions that have not been anticipated by the author of the scripts. Additionally, existing shopbots cannot provide tradeoff information, compare options/features, or compare different products.

BRIEF DESCRIPTION OF THE DRAWINGS

Some embodiments are illustrated by way of example and not limitation in the figures of the accompanying drawings.

DETAILED DESCRIPTION

Figure 1:
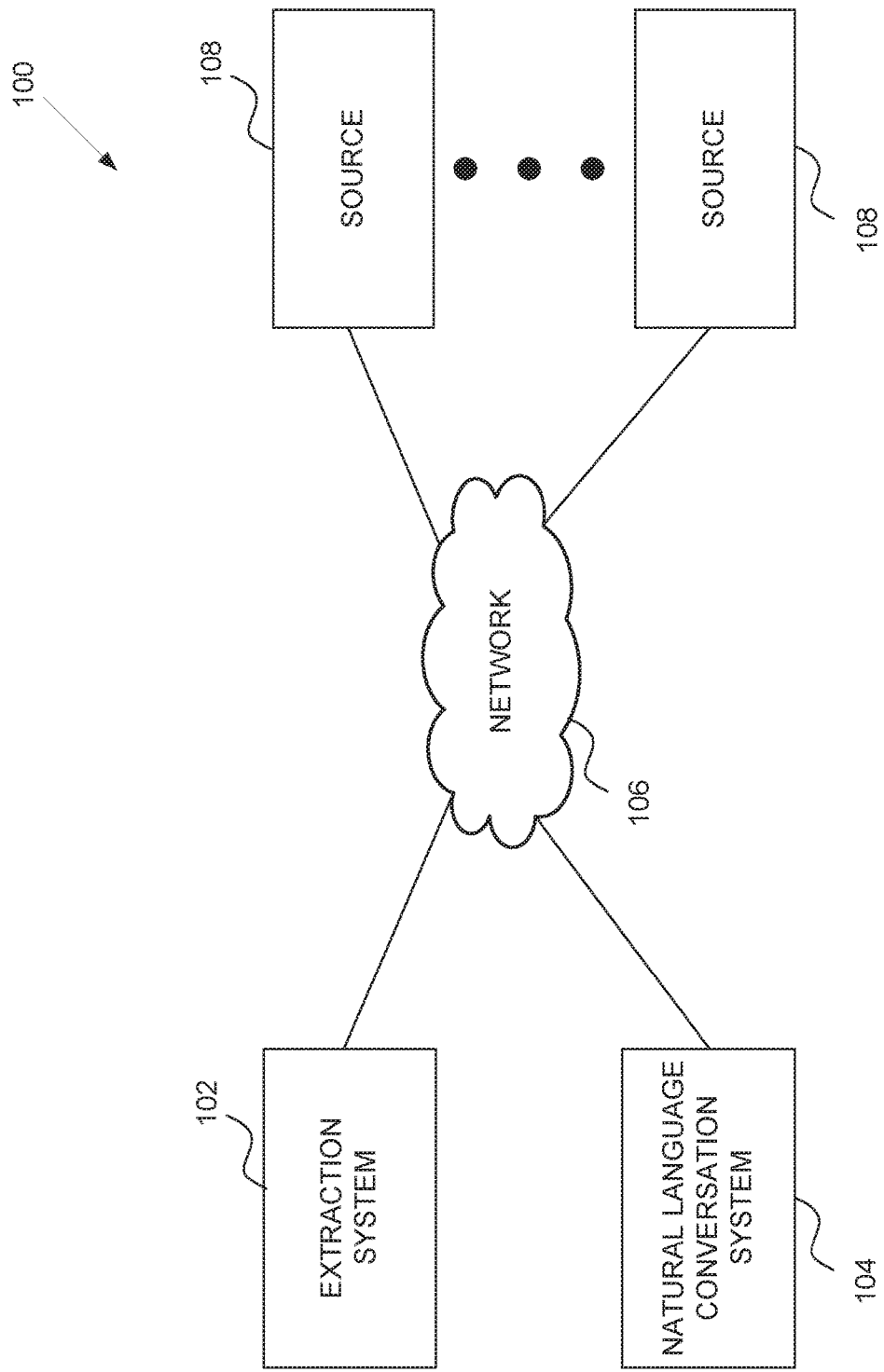
FIG. 1 is a diagram illustrating a network environment suitable for providing natural language conversational assistances using extracted guidance knowledge, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for improving an information provisioning system by providing a natural language conversational assistant (also referred to as a "machine agent"). Example embodiments are directed to generating a product knowledge database (also referred to as a "guidance knowledge database) and using the product knowledge database to provide conversational assistance through the machine agent. A machine (e.g., extraction system) performs a machine-based offline knowledge extraction process. The machine-based offline knowledge process comprises extracting textual statements about product features from product guides and reviews for each of one or more products. The extracted textual statements are then normalized for each given product. The machine then computes polarity for each of the extracted textual statements, and computes support for the extracted textual statements. The extracted textual statements, corresponding polarity, and corresponding support are stored by the machine to the product knowledge database.

During runtime, the machine agent (e.g., a natural language conversation system) receives a request for information for one or more products during an interactive natural language conversation between the machine agent and a user. In response to receiving the request, the machine agent accesses the extracted textual statements from the product knowledge database and accesses user preferences for the user from a user knowledge database. Based on the user preferences, the accessed textual statements, and an overall empirical utility of each of the accessed textual statements, the machine agent determines, in real-time, one or more statements of the accessed textual statements to convey to the user during the interactive natural language conversation. The machine agent then provides the one or more statements to the user. For example, the machine agent provides a textual response in a user interface through which the interactive natural language conversation is conducted, or the machine agent provides an audio response through a speaker.

In some embodiments, the machine agent also elicits feedback from the user during the interactive natural language conversation regarding a product that the user has purchased, obtained, was gifted, or otherwise possesses. The feedback can then be processed by the machine in a next machine-based offline knowledge process that updates the product knowledge database.

Thus, example methods (e.g., algorithms) and example systems (e.g., special-purpose machines) are configured to improve an information provisioning system. Typically, users often spend quite some time reading buying guides and consumer reviews to acquire knowledge about products and to compare features of different products. Example embodiments automatically extract this information (e.g., extracted textual statements) from buying guides and reviews, and structures the textual statements in such a way that the textual statements can be used, for example, to make contrastive statements between products during an interactive natural language conversation between a user and a machine agent. The textual statements are then leveraged in a natural language conversation system to, in real-time, determine and provide an overview of a product, answer questions about specific features, and contrast strengths and weaknesses of various products, for example, in response to a query. Thus, example embodiments summarize and normalize reviews and provisions the information to the user in a very condensed and personalized form.

Therefore, one or more of the methodologies described herein facilitate solving the technical problem of providing concise and condensed information to a user in natural way (e.g., using natural language). By using the example embodiments, users do not need to access and review a plethora of information online, including having to open multiple browsers in order to view, compare, and contrast information between different products. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagram illustrating a network environment 100 suitable for providing natural language conversational assistance using extracted guidance knowledge, according to some example embodiments. The network environment 100 includes an extraction system 102 and a natural language conversation system 104 communicatively coupled via a network 106 to each other and to a plurality of sources 108. In example embodiments, the extraction system 102 comprises components that extract textual statements for products from information (e.g., reviews, product guides) accessed from the plurality of sources 108. In example embodiments, the plurality of sources 108 are third party sources. The extraction system 102 also computes polarity and support for each extracted textual statement. The components of the extraction system 102 are described in more detail in connection with FIG. 2, and may be implemented in a computer system, as described below with respect to FIG. 6.

The natural language conversation system 104 comprises components that facilitate a natural language conversation between the natural language conversation system 104 (also referred to as a "machine agent") and the user that wants to obtain information pertaining to certain products. The natural language conversation system 104 communicates with the extraction system 102 to obtain the information (e.g., textual statements), determines, in real time, which statements to convey (without the use of a script), and presents the statements in a natural language response. The components of the natural language conversation system 104 will be discussed in more detail in connection with FIG. 3, and may be implemented in a computer system, as described below with respect to FIG. 6.

The sources 108 comprise websites or entities that have product reviews, product guides, or other information pertaining to products (collectively referred to as "product information"). In example embodiments, the extraction system 102 accesses the product information on the sources 108 (e.g., by using a web crawler) to extract textual statements regarding products, as will be discussed in more detail below.

The components of FIG. 1 are communicatively coupled via the network 106. One or more portions of the network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 106 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined into a single component, and the functions described herein for any single component may be subdivided among multiple components. Additionally, any number of extraction systems 102, natural language conversation systems 104, and sources 108 may be embodied within the network environment 100. Furthermore, some components or functions of the network environment 100 may be combined or located elsewhere in the network environment 100. For example, some of the functions of the extraction system 102 may be embodied within the natural language conversation system 104 or vice-versa.

Figure 2:
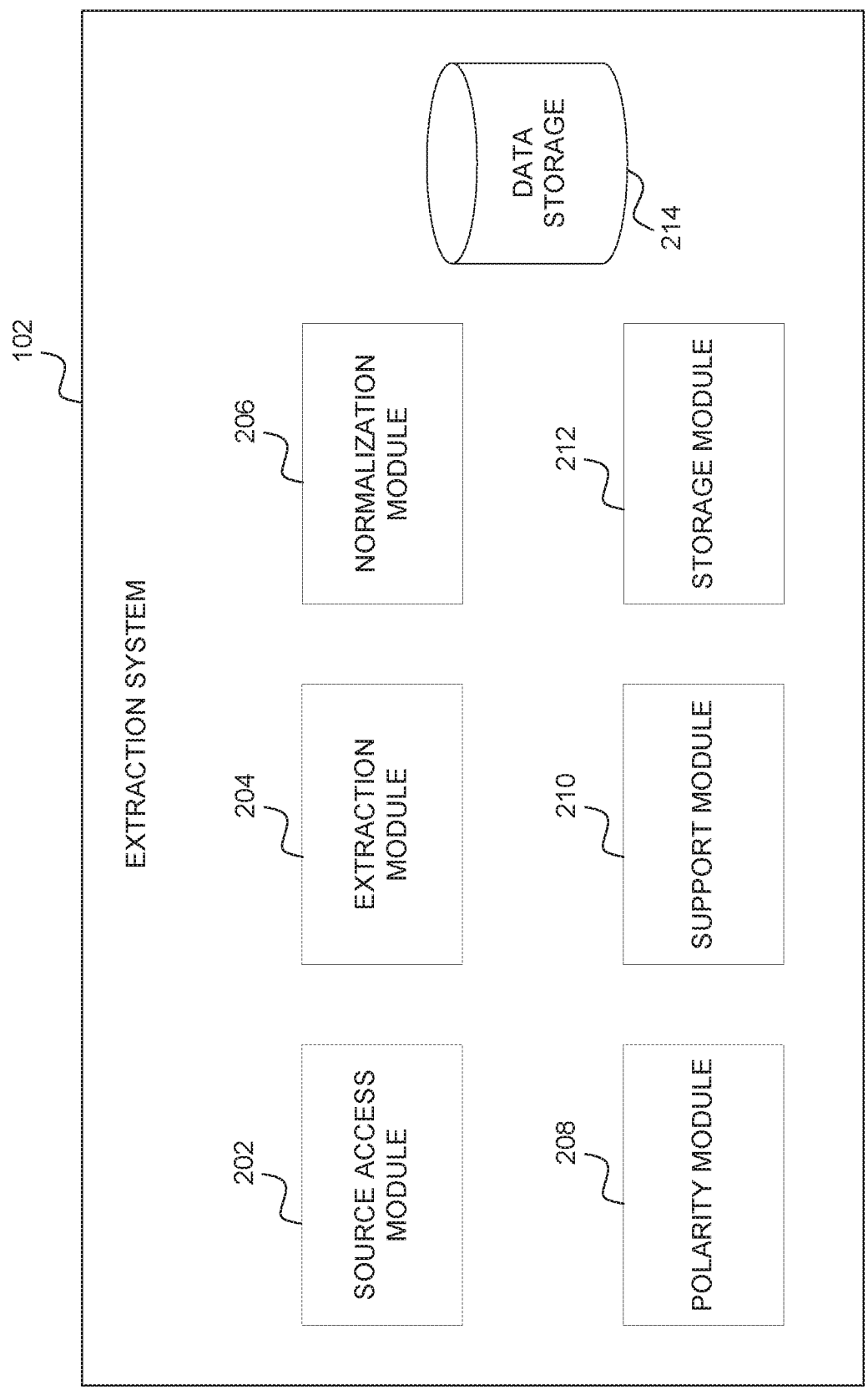
FIG. 2 is a block diagram illustrating components of an extraction system, according to some example embodiments.

FIG. 2 is a block diagram illustrating components of the extraction system 102, according to some example embodiments. In various embodiments, the extraction system 102 performs an offline knowledge extraction process. The offline knowledge extraction process comprises accessing and extracting textual statements from the sources 108, normalizing the extracted textual statements, computing support and polarity for the extracted textual statements, and generating the product knowledge database. To enable these operations, the extraction system 102 comprises a source access module 202, an extraction module 204, a normalization module 206, a polarity module 208, a support module 210, a storage module 212, and a data storage 214 all configured to communicate with each other (e.g., via a bus, shared memory, or a switch). The extraction system 102 may also comprise other components (not shown) that are not pertinent to example embodiments. Furthermore, any one or more of the components of FIG. 2 (e.g., modules, storage) described herein may be implemented using hardware (e.g., a processor of a machine) or a combination of hardware and software. Moreover, any two or more of these components of FIG. 2 may be combined into a single component, and the functions described herein for a single component may be subdivided among multiple components.

In example embodiments, the source access module 202 accesses product information on the sources 108. For example, the source access module 202 may use one or more web crawlers to access the product information. The product information may be embodied within product guides, product reviews (e.g., by consumers or critics), or any other form of product information (e.g., manufacturer product specifications, manufacturer website).

The extraction module 204 analyzes the accessed product information and extracts (e.g., parses) key textual statements. In some embodiments, the extraction module 204 analyzes and extracts the key textual statements directly from the source 108. In other embodiments, the source access module 202 obtains a copy of the product information from the source 108 and locally stores or caches the product information at the extraction system 102. In these embodiments, the extraction module 204 analyzes and extracts the key textual statements from the locally stored or cached copy of the product information.

Key statements are statements about specific features, characteristics, or sub-components of a product or about the product itself. Example embodiments, leverage Part-of-Speech Tagging (POST) and Named Entity Recognition (NER) to solve the problem. POST is used to identify a grammatical function of the words composing a sentence (e.g., articles, verbs, nouns, adjectives), and NER is used to identify a semantic function of the words. For the sentence "I feel the handle is not very comfortable," POST identifies "handle" as a noun, and NER classifies "handle" as a "part or component." In other words, identifying "key statements" comprises filtering sentences with noun identifying features, characteristics, or sub-components of a product. Once these statements have been identified, Natural Language Understanding techniques are applied to perform deep semantic parsing of these key statements and decompose the statements into their constituents: the feature, characteristic, component, or product being commented in the review, and the comment itself (e.g., "not very comfortable"). Other constituents (e.g., "I feel") are ignored for key statement identification but are retained for subsequent steps (e.g., sentiment analysis). While pre-trained POST engines are publicly available, there are no NER engines available for e-commerce data. However, NER can be approached as a machine learning problem and specific models can be trained to recognized features, characteristics, and products.

As an example, the product is a particular brand of a razor. The extraction module 204 analyzes several product reviews and extracts the following key textual statements: A) "The razor is easy to manipulate;" B) "It fits well into the hand and is easy to use;" and C) "I feel the handle is not very comfortable."

The normalization module 206 normalizes the extracted textual statements across all reviews or product guides of a given product. In some embodiments, the normalization module 206 approximates a function F of two arguments which takes two of the textual statements as input and computes their similarity as a number between 0 and 1 (e.g., a probability). Continuing with the example F("The razor is easy to manipulate", "It fits well into the hand and is easy to use") would be high (e.g., close to 1), while F("The razor is easy to manipulate", "It excels at giving a close shave") would be low (e.g., close to 0). The function F computes the similarity between statements but does not provide the normalized form of these statements. Assuming statements A, B, C, and D are very similar (e.g., the function F provides a high score for all pairs), the normalized form is selected by picking, as the normalized form, the most frequent statement among A, B, C, and D or picking one of the statements randomly if they all have the same frequency.

While this function F can be approximated using hand crafted synonym dictionaries, a more scalable approach is to cast the problem into a machine learning task and to leverage deep learning to approximate F. In particular, Siamese Neural Networks can be used to train function F with pairs of very similar sentences (e.g., positive examples) and pairs of very dissimilar sentences (e.g., negative examples). Negative examples can be generated very easily by sampling random statements from, for example, the product reviews since it is unlikely that two sentences from the same review have the same semantic. Positive examples can be generated using dictionaries or manually. Thus for the example, statement A, B, and C can be normalized to "ease of use." The similarity function F is important as it allows the extraction system 102 and the natural language conversation system 104 to relate and contrast facts (e.g., textual statements) from different reviews. It also allows for the comparing and contrasting of facts (e.g., textual statements) for different products.

The polarity module 208 computes the polarity of the textual statements. In example embodiments, the polarity module 208 performs a sentiment analysis. Sentiment analysis refers to the use of natural language processing, text analysis, and/or computational linguistics to systematically identify, quantify, and study affective states and subjective information. More particularly, sentiment analysis aims to determine an attitude of a writer (of the review or product guide) with respect to the product, an overall contextual polarity, or an emotional reaction to the product. For the razor example, the polarity module 208 identifies statement A and statement B as positive, and statement C as negative.

The support module 210 computes support of each textual statement. The support is a measure of how many users are mentioning the textual statement (or a similar phrase in the textual statement) and, in some cases, with what polarity. In one embodiment, the support module 210 implements a counter to measure a number of times each textual statement is mention in the product information e.g., measure of normalized statement). Additionally, the support module 210 may take the polarity determined by the polarity module 208 into consideration. In example embodiments, the support module 210 counts both positive and negative statements, and stores three numbers for each statement: overall count, positive count, and negative count. In most embodiments, the overall count should be the sum of the positive and negative counts The support and polarity for each textual statement may be used by the natural language conversation system 104 in determining, in real time, which statements to convey to a user in response to a query.

The storage module 212 stores the extracted textual statements along with the corresponding support and polarity (also referred to herein as "attributes") to the data storage 214. The storage of the extracted textual statements and attributes generates or updates the product knowledge database that is used, during runtime, by the natural language conversation system 104 to determine and provide statements to a user in response to a query.

Figure 3:
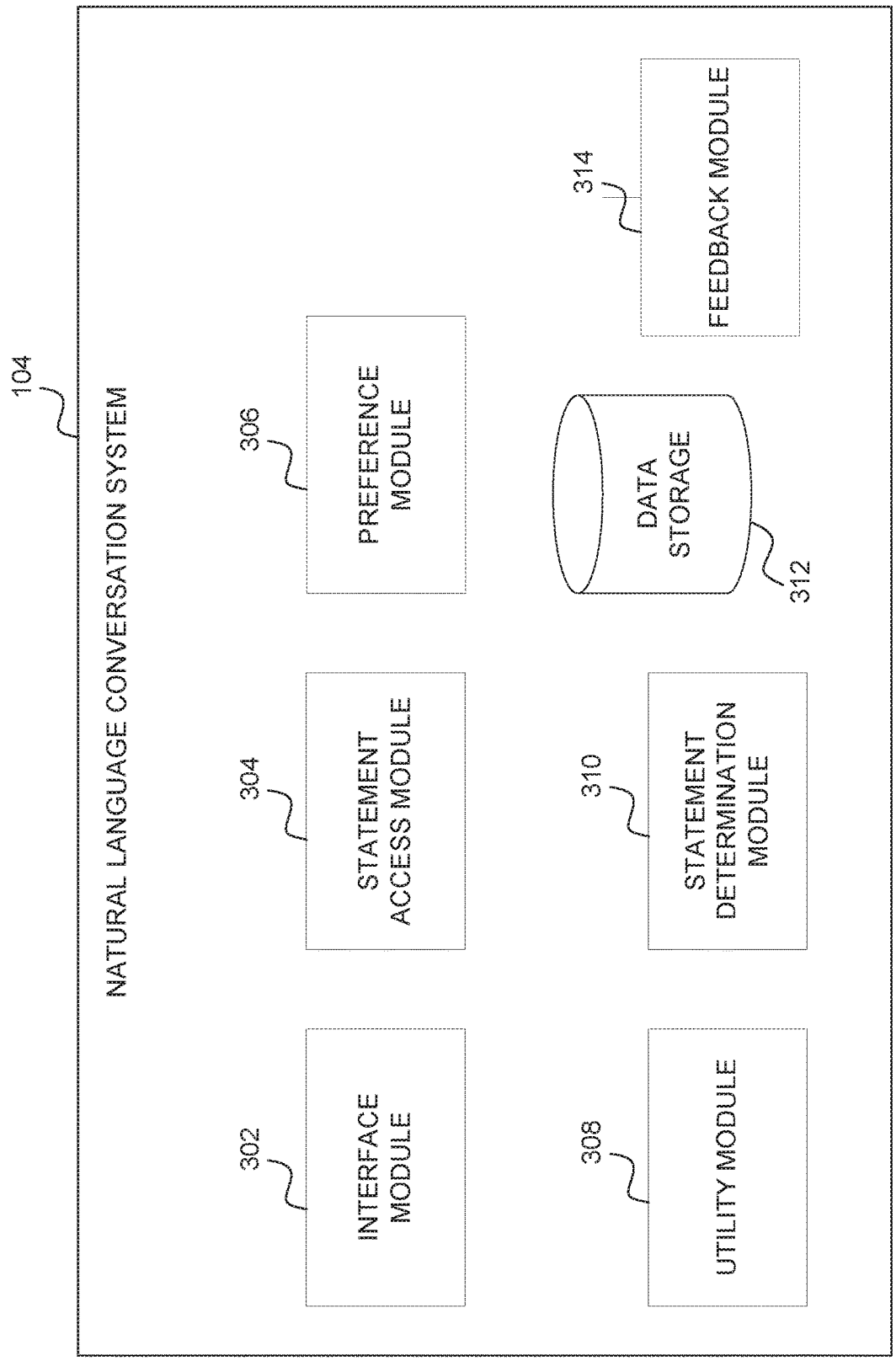
FIG. 3 is a block diagram illustrating components of a natural language conversation system, according to some example embodiments.

FIG. 3 is a block diagram illustrating components of the natural language conversation system 104, according to some example embodiments. In various embodiments, the natural language conversation system 104 facilitates a real-time, natural language conversation between the natural language conversation system 104 (e.g., machine agent) and a user that is interested in obtaining product information. To enable these operations, the natural language conversation system 104 comprises an interface module 302, a statement access module 304, a preference module 306, a utility module 308, a statement determination module 310, a data storage 312, and a feedback module 314 all configured to communicate with each other (e.g., via a bus, shared memory, or a switch). The natural language conversation system 104 may also comprise other components (not shown) that are not pertinent to example embodiments. Furthermore, any one or more of the components of FIG. 3 (e.g., modules, storage) described herein may be implemented using hardware (e.g., a processor of a machine) or a combination of hardware and software. Moreover, any two or more of these components of FIG. 3 may be combined into a single component, and the functions described herein for a single component may be subdivided among multiple components.

The interface module 302 manages exchange of information between the natural language conversation system 104 and a user. In example embodiments, the interface module 302 provides an interface through which the user can have an interactive natural language communication with the natural language conversation system 104 or machine agent. In one embodiment, the interface is a graphic user interface that is caused to be displayed on a device of the user. For example, the graphic user interface may comprise a chat window. In an alternative embodiment, the interface is an audio interface whereby the user presents queries and feedback via a microphone or telephone, and the natural language conversation system 104 or machine agent conveys information through a speaker to the user.

In response to receiving a query from the user via the interface, the statement access module 304 accesses the product knowledge database stored within the data storage 312, and identifies one or more textual statements that pertain to the query, as well as their attributes (e.g., support and polarity). In some embodiments, the data storage 312 is a copy of the data storage 214 of the extraction system 102. In other embodiments, the natural language conversation system 104 does not embody the data storage 312. Instead, the statement access module 304 accesses the product knowledge database stored at the data storage 214 (or elsewhere in the network environment 100) via the network 106.

The preference module 306 manages user preferences at the natural language conversation system 104. In example embodiments, user preferences for each user are stored in a corresponding account in the data storage 312. The user preferences include, for example, gender, location, and past purchases. The user preferences or account may also include other information such as feedback provided by the user on products and data from past conversations with the natural language conversation system 104. During runtime, the preference module 306 accesses the user preferences of the user, which may be used by the statement determination module 310 in determining which textual statement(s) will be provided to the user during the conversation.

The utility module 308 determines an empirical utility of a statement. The empirical utility of a statement quantifies how likely communicating the statement is to result in a purchase of the specific product. In example embodiments, the utility module 308 estimates the empirical utility, for example, based on past conversations using the same statements with a plurality of users over a period of time and a determination of whether the plurality of users performed an action based on the statements and the past conversation (e.g., purchase the product).

The statement determination module 310 determines, in real-time, one or more statements based on a query to convey to the user during the conversation. While the statement determination module 310 cannot observe directly an impact of actions by the natural language conversation system 104 (e.g., information provided by the natural language conversation system 104) on a state of the user (e.g., satisfaction of the user), the statement determination module 310 has indirect access to the state through a reward. For example, the reward is very high if the user decides to purchase a product for which the natural language conversation system 104 provides information, medium if the user stays engaged in the conversation, and minimum if the user leaves the conversation before a threshold amount of time in the conversation or threshold number of queries asked. The rules to choose what action to perform (e.g., what information to communicate) are called "policies." The process is stochastic as how the user may react to specific information depends on the user themselves and on the product. In some cases, rewards may be delayed (e.g., the user purchases the product a week later).

As an example, states are denoted with the letter s, rewards with the letter r, and actions with the letter a. A conversation can be described by the sequence:

s0,a0,r1,s1,a1,r2,s2,a2, . . . , sn,rn.

In the classical Deep Reinforcement Learning setting, the Q-learning algorithm aims at computing, for most pairs of states and actions, a function Q(s,a) representing a maximum discounted future reward when the machine agent performs action a in state s, and continues optimally from that point on.

$$Q(s,a)=r+\gamma \max_{a'} Q(s',a')$$

In this example, contrary to the standard approach, the reward is unknown in advance by the machine agent and can only be estimated indirectly. Possible factors to estimate the reward to a specific question include one or more of, for example, overall empirical utility of each statement, support of each statement as computed by the off-line knowledge extraction process, knowledge about the user preferences, extrinsic factors (e.g., marketing strategy, demand, supply, and other marketplace utility metrics), duration of the conversation (e.g., to deliver most informative statements in the beginning), or durations of previous conversations with the user.

Once the statement determination module 310 determines the textual statement(s) to return to the user, the statement determination module 310 provides the textual statement to the interface module 302. The interface module 302 then causes presentation of the textual statement to the user (e.g., textually via a user interface or audibly via a speaker).

The feedback module 314 elicits information from the user during a conversation. In some embodiments, the feedback module 314 may elicit more information in order to determine the statement to return to the user. In other embodiments, the feedback module 314 obtains information for products that the user has previously shown interest in (e.g., purchased) or to verify information that the natural language conversation system 104 already has on the product. Accordingly, the natural language conversation system 104 can observe an entire life cycle of its users, and can leverage information from users who bought a specific product to improve the guidance knowledge of the natural language conversation system 104.

In example embodiments, the feedback module 314 prompts the user, via the interface module 302, with questions about specific features, strengths, or weaknesses of a product they have bought. As such, the feedback module 314 provides a new way to collect consumer reviews without putting on the users the burden of writing entire reviews. The challenge is for the feedback module 314 to decide which question(s) to ask to the user. To address this challenge, the natural language conversation system 104 leverages Deep Reinforcement Learning to estimate an overall potential reward associated with an answer to a particular question. The overall potential reward is based on other users that may in the future inquire about a specific product. The overall potential reward can be estimated using multiple factors including, for example, one or more of (1) how popular the products the question relates to are; (2) marketing strategy; (3) how likely is the user to have the answer to this question; or (4) the statement and polarity of the answer to a question if already know by the machine agent (e.g., if opinions are very mixed about a specific product feature).

The information obtained by the feedback module 314 is stored to the data storage (e.g., data storage 212 or 312). The information is later processed in the off-line knowledge extraction process by the extraction system 102 and may be used to update the product knowledge database.

Figure 4:
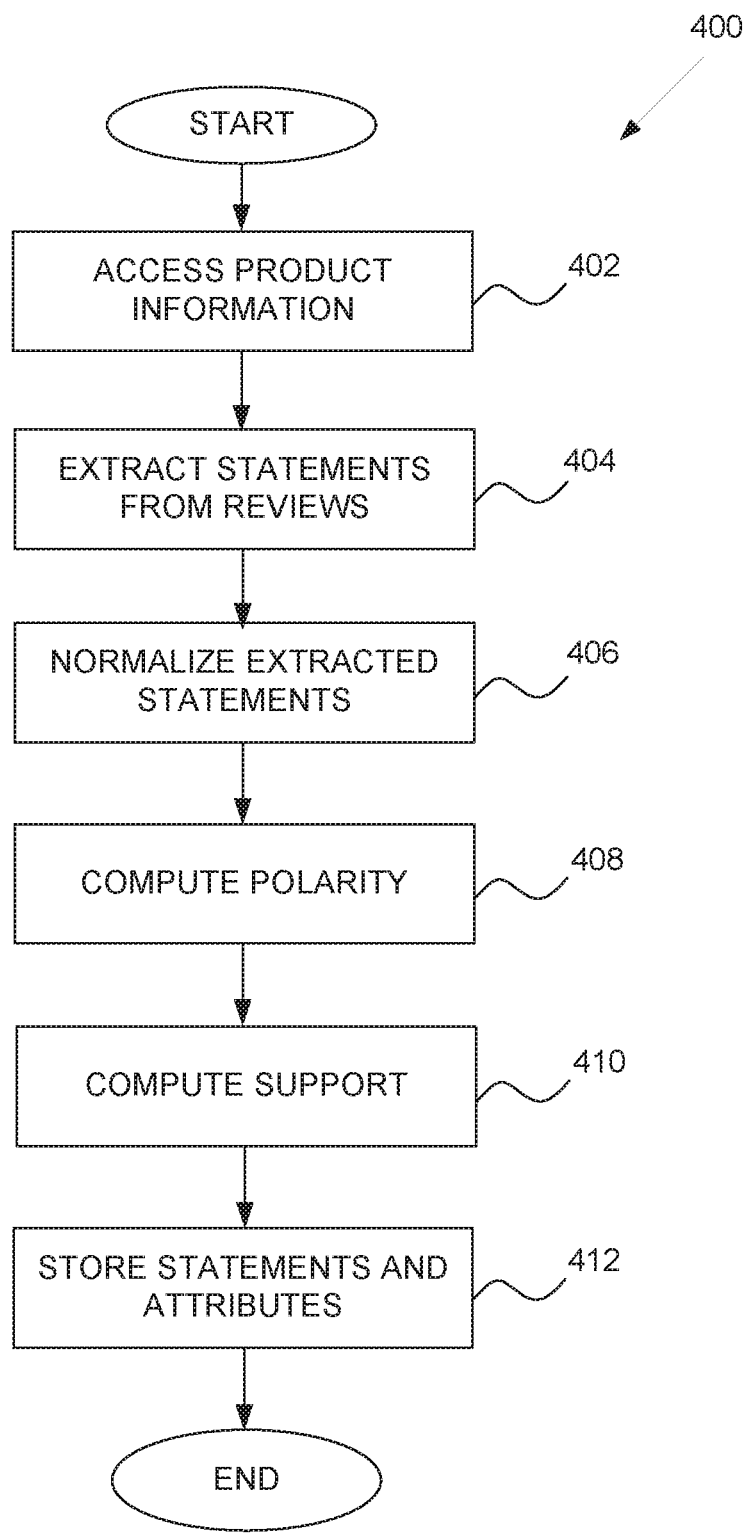
FIG. 4 is a flowchart illustrating operations of a method for generating a guidance knowledge database.

FIG. 4 is a flowchart illustrating operations of a method 400 for generating a guidance knowledge database, according to some example embodiments. Operations in the method 400 may be performed by the extraction system 102, using components described above with respect to FIG. 2. Accordingly, the method 400 is described by way of example with reference to the extraction system 102. However, it shall be appreciated that at least some of the operations of the method 400 may be deployed on various other hardware configurations or be performed by similar components residing elsewhere in the network environment 100. Therefore, the method 400 is not intended to be limited to the extraction system 102.

In operation 402, the extraction system 102 accesses product information. In example embodiments, the source access module 202 accesses the sources 108 to obtain or access product information. For example, the source access module 202 may use one or more web crawlers to identify and access the product information. The product information may be embodied within product guides, product reviews (e.g., by consumers or critics), or any other form of product information (e.g., manufacturer product specifications, manufacturer website).

In operation 404, the extraction module 204 analyzes the accessed product information and extracts (e.g., parses) key textual statements. The extraction module 204 may use natural language processing to extract the key textual statements. In some embodiments, the extraction module 204 analyzes and extracts the key textual statements directly from the source 108. In other embodiments, the source access module 202 obtains a copy of the product information from the source 108 and locally stores or caches the product information at the extraction system 102. In these embodiments, the extraction module 204 analyzes and extracts the key textual statements from the locally stored or cached copy of the product information.

As an example, the product is a particular brand of a razor. The extraction module 204 analyzes several product reviews and extracts the following key textual statements: A) "The razor is easy to manipulate;" B) "It fits well into the hand and is easy to use;" and C) "I feel the handle is not very comfortable."

In operation 406, the normalization module 206 normalizes the extracted textual statements across all reviews or product guides of a given product. In some embodiments, the normalization module 206 approximates a function F of two arguments which takes two of the textual statements as input and computes their similarity as a number between 0 and 1 (e.g., a probability). Continuing with the example F("The razor is easy to manipulate", "It fits well into the hand and is easy to use") would be high (e.g., close to 1), while F("The razor is easy to manipulate", "It excels at giving a close shave") would be low close to 0). In one embodiment, a machine learning task is used to leverage deep learning to approximate F. For example, Siamese Neural Networks can be used to train function F with pairs of very similar sentences (e.g., positive examples) and pairs of very dissimilar sentences (e.g., negative examples). Thus for the example, statement A, B, and C can be normalized to "ease of use."

In operation 408, the extraction system 102 computes the polarity of the statement(s). In example embodiments, the polarity module 208 computes the polarity of the textual statements using a sentiment analysis. As a result, with the example, the polarity module 208 identifies statement A and statement B as positive, and statement C as negative.

In operation 410, the extraction system 102 computes support for the statement(s). In example embodiments, the support module 210 computes support of each statement. In one embodiment, the support module 210 implements a counter to measure a number of times each textual statement (or similar textual statement) is mentioned in the product information. Additionally, the support module 210 may take the polarity determined by the polarity module 208 into consideration.

In operation 412, the statements and attributes (e.g., polarity, support) are stored to a data storage (e.g., data storage 214). In example embodiments, the storage module 212 stores the extracted textual statements along with the corresponding support and polarity. The storage of the extracted textual statements generates/updates the product knowledge database that is used, during runtime, by the natural language conversation system 104 to provide product information to a user.

Figure 5:
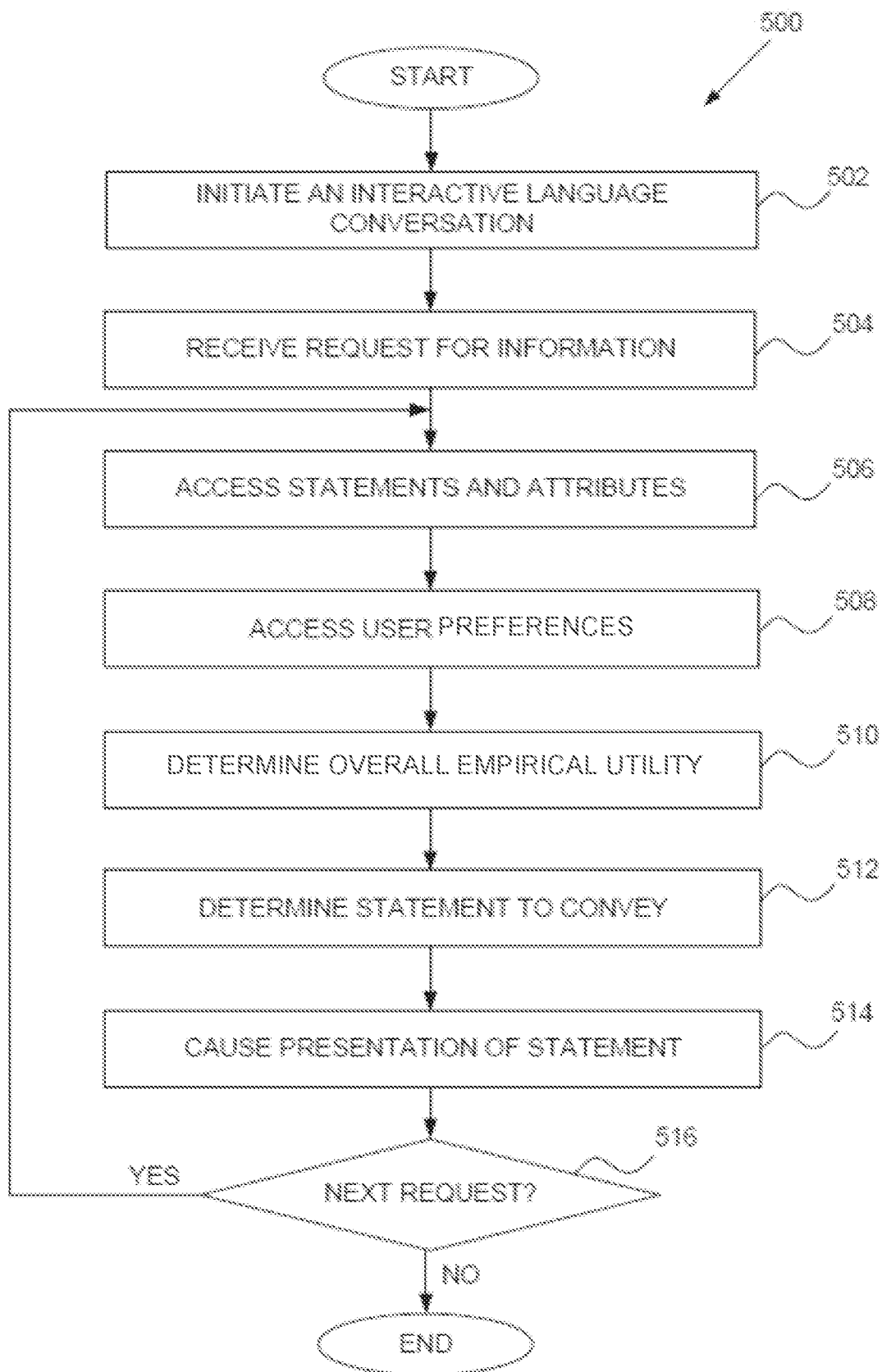
FIG. 5 is a flowchart illustrating operations of a method for providing natural language conversation assistance using the guidance knowledge database, according to some example embodiments.

FIG. 5 is a flowchart illustrating operations of a method 500 for providing natural language conversation assistance using the guidance knowledge database, according to some example embodiments. Operations in the method 500 may be performed by the natural language conversation system 104, using components described above with respect to FIG. 3. Accordingly, the method 500 is described by way of example with reference to the natural language conversation system 104. However, it shall be appreciated that at least some of the operations of the method 500 may be deployed on various other hardware configurations or be performed by similar components residing elsewhere in the network environment 100. Therefore, the method 500 is not intended to be limited to the natural language conversation system 104.

In operation 502, the natural language conversation system 104 initiates a natural language conversation with a user. In some embodiments, the user triggers the natural language conversation by making a selection. In these embodiments, the interface module 302 receives the selection and provides an interface through which the user can conduct an interactive natural language communication with the natural language conversation system 104 or machine agent. In an alternative embodiment, the natural language conversation system 104 detects that the user is looking at products and proactively asks the user if the user would like product guidance. In response to an affirmative answer, the interface module initiates the natural language conversation (e.g., provides the interface). In one embodiment, the interface is a graphic user interface that is caused to be displayed on a device of the user. For example, the graphic user interface may comprise a chat window. In an alternative embodiment, the interface is an audio interface whereby the user presents queries and feedback via a microphone or telephone, and the natural language conversation system 104 or machine agent conveys information through a speaker to the user.

In operation 504, the natural language conversation system 104 (e.g., the interface module 302) receives a natural language request for information or a natural language query for information from a user. For example, the user may input, via the interface, "Hey agent, I'd like to buy an electric razor, can you help me? What do you have?" or "Can you tell me about the Braun 9290?" In some cases, the interface module 302 uses natural language processing to identify or determine what the user is communicating/asking product(s) being referenced, a feature of interest).

In response to receiving the query from the user via the interface, the statement access module 304 accesses statements and their attributes (e.g., polarity, support) from the product knowledge database in operation 506. In various embodiments, the statement access module 304 looks for statements that match the product being referenced and the question being asked in the query. For example, if the user asks a question about a particular feature of a product, the statement access module 304 accesses (or retrieves) statements that match the product and feature of the query. Thus, if the user asks the question "Can you tell me about the Braun 9290?", the statement access module 304 accesses statements for the Braun 9290. Further still, if the user asks a question regarding a particular feature of the razor (e.g., How many blades does the Braun 9290 have?"), the statement access module 304 accesses and retrieves statements regarding the particular feature for the product. In some embodiments, the statement access module accesses a local data storage (e.g., data storage 312), which comprises a copy of information stored at the extraction system 102. In other embodiments, the statement access module 304 accesses the product knowledge database stored at the extraction system 102 via the network 106.

In operation 508, the preference module 306 accesses user preferences for the user. In example embodiments, user preferences include, for example, gender, location, and past purchases. The user preferences or account may also include other information such as feedback provided by the user on products and data from past conversations with the natural language conversation system 104. In some embodiments, the user preferences of the user may be used in determining which textual statement(s) to provide to the user during the conversation. Continuing with the razor example, if the user asking "Hey agent, I'd like to buy an electric razor, can you help me? What do you have?" is female, the natural language conversation system 104 or machine agent will provide information for women razors. In other embodiments, the natural language conversation system 104 may clarify with the user whether she is interested in male or female razors. In another example, if the user has purchased a particular brand of razor in the past, the natural language conversation system 104 or machine agent may provide information for that particular brand of razor first.

In operation 510, the utility module 308 determines an overall empirical utility of each statement. The overall empirical utility of a statement quantifies how likely communicating the statement is to result in a purchase of the specific product. In example embodiments, the utility module 308 estimates the overall empirical utility, for example, based on past conversations for a plurality of users over a period of time and a determination of whether the plurality of users performed an action based on the statement and the past conversation (e.g., purchase of the product). In some embodiments, a machine learning model is trained to correlate the actions with the statements provided during the past conversation in order to determine the overall empirical utility. That is machine learning can be used to try to predict (approximate) a utility of a statement (seen in the past or for which no data is available). Training data includes historical statement-purchase information from the conversation history. Note, however, that additional sources of information can be leveraged as well. For instance, some of the features or components commented in statements may also be exposed on a web site and the number of times these features are used to filter search results or lead to a successful purchase would be valuable information. Thus, for example, if a particular statement resulted in users in the past purchasing the product, the particular statement will have a higher overall empirical utility. In some cases, the empirical utility is determined prior to receiving the request in operation 504 and is stored, as an attribute, with the statement. In these cases, operation 508 comprises accessing or identifying the stored overall empirical utility.

In operation 512, the statement determination module 310 determines one or more statements to convey to the user during the conversation. The goal of the natural language conversation system 104 or machine agent is to maximize user satisfaction and ultimately trigger a purchase from the user. Thus, the natural language conversation system 104 or machine agent has to decide at every single turn of the conversation what information to deliver to the user that will facilitate user satisfaction and purchase. As a result, the natural language conversation system 104 or machine agent has to constantly identify which information (e.g., statement(s)) is likely the most valuable to the user.

In example embodiments, the statement determination module 310 makes the determination based on one or more of the user preferences, overall empirical utility of the statements, support for the statements, or polarity of the statement. For example, more reviews or statements about a fact or feature (e.g., higher support) will cause the statement to be of more interest (e.g., weighted higher). In another example, the stronger the polarity of a statement, the more interesting the statement may be (e.g., weighted higher). In further embodiments, the statement determination module 310 takes other extrinsic factors into consideration such as, for example, marketing strategies, demand, supply, trends, or other marketplace utility metrics. Once the statement determination module 310 determines the textual statement(s) to return to the user, the statement determination module 310 provides the textual statement to the interface module 302. The interface module 302 then causes presentation of the textual statement to the user (e.g., textually via a user interface or audibly via a speaker) in operation 514. For example, if the query is "How many blades does the Braun 9290 have?", the natural language response (e.g., textual statement) that is presented to the user may be "The Braun 9290 has five shaving elements." Because the response is a natural language response that answers a specific question of the user, the user will likely feel like they are having a natural conversation with a human and not a machine agent (e.g., that a real person is answering the question via the chat window). In some cases, a human agent (in lieu of the natural language conversation system 104) can be involved to create training data for the various components discussed above.

In operation 516, a determination is made as to whether a next request for information is received. For example, the user may have a follow up question based on the presented textual statement presented in operation 514. If a next request is received, then the method 500 returns to operation 506.

In embodiments where the request for information is a request for comparison between two products, the natural language conversation system 104 receives a request for the comparison in operation 504. For example, the user may input, via the interface, "Hey agent, "Can you explain the differences between the Braun 9290 and the Philips 8900."

In response to receiving this query, the statement access module 304 accesses statements and their attributes for the two products from the product knowledge database in operation 506. The accessed statements comprise statements regarding features of each product, and in some cases, similar features that can be compared/contrasted between the two products. For example, the accessed statements may involve ease of use, price, quality, or specific product features (e.g., number of blades in the razor, dimensions, weight). Further in operation 510, the utility module 308 determines an overall empirical utility of each statement accessed for the two products.

The statement determination module 310 determines statements to convey to the user during the conversation with respect to the two products in operation 512. For the razor example, the statement determination module 310 may select statements "The Braun 9290 has five shaving elements" and "The Philips 8900 has three shaving heads" as a comparison of the number of blades or shaving elements. The selected statements are then presented in operation 514 in response to the query. It is noted that any number of statements regarding any number of features may be selected by the statement determination module 310 to be presented in response to a query.

In some embodiments, the natural language conversation system 104 elicits information from the user, via the feedback module 314, during the conversation. In example embodiments, the feedback module 314 asks a natural language question to elicit the information For example, the natural language conversation system 104 may need more information in order to determine the statement to present to the user. Alternatively, the feedback module 314 obtains information for products that the user has previously shown interest in (e.g., purchased) or to verify information that the natural language conversation system 104 already has on the product. For example, the feedback module 314 may ask "What features of the Braun 9290 do you like most?" Thus, the feedback module 314 may prompt the user, via the interface module 302, with questions about specific features, strengths, or weaknesses of a product they have bought. As such, the feedback module 314 collects consumer reviews without burdening users with writing entire reviews. The information obtained by the feedback module 314 is stored and later processed in the offline knowledge extraction process by the extraction system 102 to update the product knowledge database.

Figure 6:
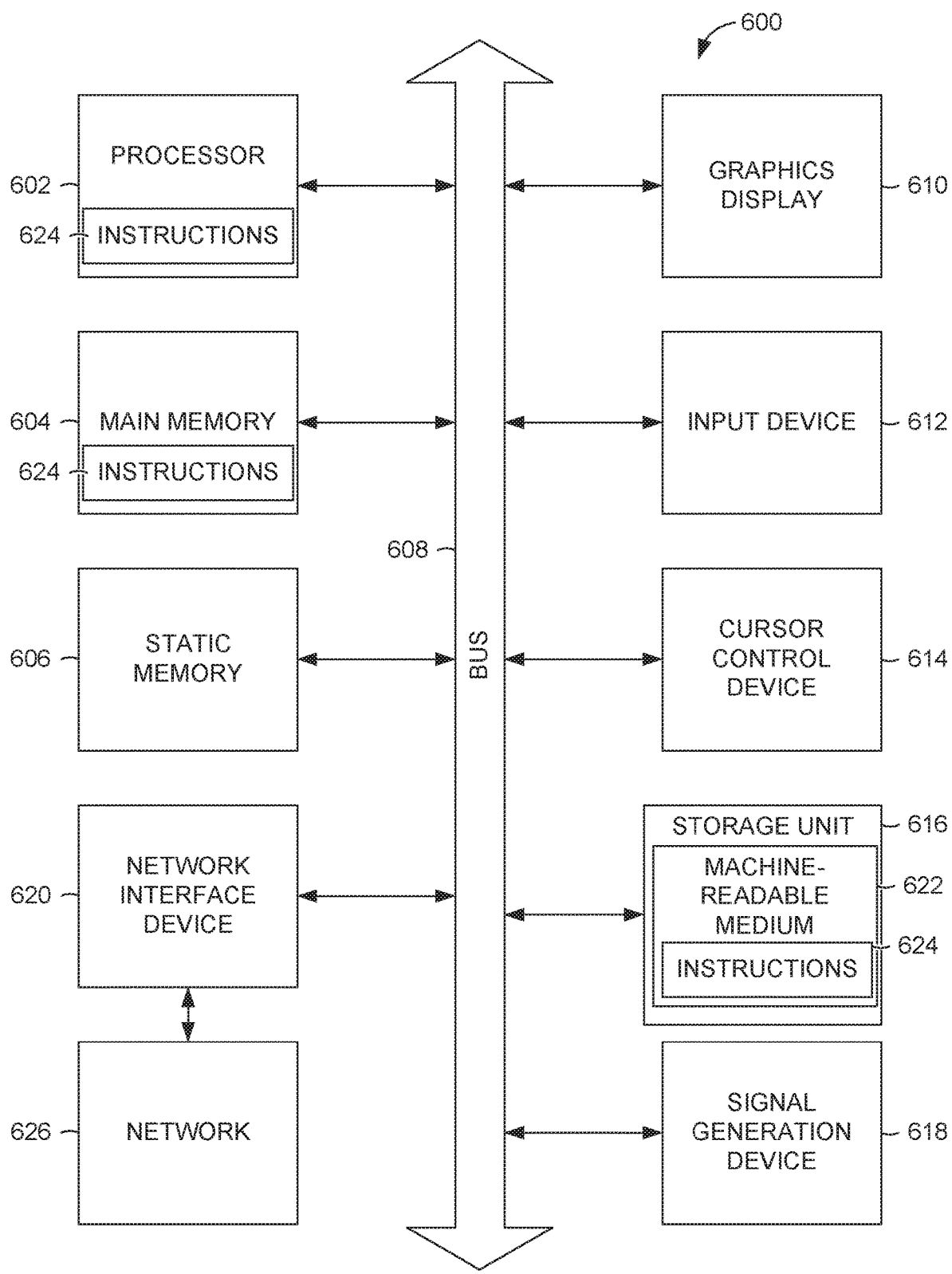
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-readable medium or machine-storage medium and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 4 and FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e,g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-readable medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing natural language conversational assistances using extracted guidance knowledge. The method comprises initiating, by a machine agent, an interactive natural language conversation between a user and the machine agent to provide the user with guidance on one or more products; receiving, via an interface by the machine agent, a request for information for the one or more products, the request comprising a natural language question inputted by the user during the interactive natural language conversation; in response to receiving the request, accessing, by the machine agent from a product knowledge database, textual statements about features of the one or more products, the textual statements obtained by a machine-based offline knowledge extraction process that extracts the textual statements from product information of the one or more products; based on the accessed textual statements about features of the one or more products and an overall empirical utility of each of the accessed textual statements, determining, by a hardware processor of the machine agent, one or more statements of the accessed textual statements to convey to the user; and causing, by the machine agent, presentation of the one or more statements as a natural language response to the user.

In example 2, the subject matter of example 1 can optionally include the determining comprises using a Q-learning algorithm, wherein a reward of the Q-learning algorithm is unknown.

In example 3, the subject matter of examples 1-2 can optionally include estimating the reward based on one or more of an overall empirical utility of each statement, support of each statement as computed by the offline knowledge extraction process, knowledge about any known user preferences, an overall empirical utility of each statement, an extrinsic factor based on marketplace utility metrics, a duration of the conversation, or durations of previous conversations with the user.

In example 4, the subject matter of examples 1-3 can optionally include prompting feedback from the user during the interactive natural language conversation regarding a product previously purchased by the user, the feedback comprising specific features of the previously purchased product or strengths and weaknesses of the previously purchased product, the feedback being stored for later processing by the off-line knowledge extraction process.

In example 5, the subject matter of examples 1-4 can optionally include the prompting the feedback comprises asking a natural language question by the machine agent to the user during the interactive natural language conversation regarding the previously purchased product.

In example 6, the subject matter of examples 1-5 can optionally include generating the product knowledge database, the generating the product knowledge database comprising: extracting the textual statements about product features from the product information; normalizing the extracted textual statements across the product information of a given product; based on the normalizing, computing polarity of the extracted textual statement; computing support of the extracted textual statements; and storing the extracted textual statements, corresponding polarity, and corresponding support in the product knowledge database.

In example 7, the subject matter of examples 1-6 can optionally include wherein the computing support of the extracted textual statements comprises implementing a counter to measure a number of times each textual statement is mentioned in the product information.

In example 8, the subject matter of examples 1-7 can optionally include wherein the normalizing the extracted textual statements comprises approximating a function F of two arguments which takes two of the extracted textual statements for the given product as input and computes their similarity as a number between 0 and 1.

In example 9, the subject matter of examples 1-8 can optionally include wherein the determining is further based on the polarity and the support of each of the extracted textual statements.

In example 10, the subject matter of examples 1-9 can optionally include wherein the overall empirical utility of each of the accessed statements quantifies how likely communicating a corresponding accessed statement is to result in a purchase of a specific product; and the overall empirical utility of each of the accessed statements is estimated, by the machine agent, based on past conversations with multiple users over a period of time.

In example 11, the subject matter of examples 1-10 can optionally include wherein the request comprises a request for a comparison between two of the products; the determining the one or more statements comprises identifying statements corresponding to the two products, the statements corresponding to the two products relating to one or more features of the two products; and the causing presentation of the one or more statements comprises providing comparative information comparing the one or more features of the two products.

In example 12, the subject matter of examples 1-11 can optionally include accessing, by the machine agent, a user knowledge database of user preferences for the user requesting guidance on the one or more products, wherein the determining the one or more statements is further based on the user preferences for the user requesting guidance.

Example 13 is a system for providing natural language conversational assistances using extracted guidance knowledge. The system includes one or more processors and a memory storing instructions that, when executed by the one or more hardware processors, causes the one or more hardware processors to perform operations comprising receiving, via an interface by the machine agent, a request for information for the one or more products, the request comprising a natural language question inputted by the user during the interactive natural language conversation; in response to receiving the request, accessing, by the machine agent from a product knowledge database, textual statements about features of the one or more products, the textual statements obtained by a machine-based offline knowledge extraction process that extracts the textual statements from product information of the one or more products; based on the accessed textual statements about features of the one or more products and an overall empirical utility of each of the accessed textual statements, determining, by the machine agent, one or more statements of the accessed textual statements to convey to the user; and causing, by the machine agent, presentation of the one or more statements as a natural language response to the user.

In example 14, the subject matter of example 13 can optionally include wherein the determining comprises using a Q-learning algorithm, wherein a reward of the Q-learning algorithm is unknown.

In example 15, the subject matter of examples 13-14 can optionally include wherein the operations further comprise prompting feedback from the user during the interactive natural language conversation regarding a product previously purchased by the user, the feedback comprising specific features of the previously purchased product or strengths and weaknesses of the previously purchased product, the feedback being stored for later processing by the off-line knowledge extraction process.

In example 16, the subject matter of examples 13-15 can optionally include wherein the operations further comprise generating the product knowledge database, the generating the product knowledge database comprising: extracting the textual statements about product features from the product information; normalizing the extracted textual statements across the product information of a given product; based on the normalizing, computing polarity of the extracted textual statements; computing support of the extracted textual statements; and storing the extracted textual statements, corresponding polarity, and corresponding support in the product knowledge database.

In example 17, the subject matter of examples 13-16 can optionally include wherein the computing support of the extracted textual statements comprises implementing a counter to measure a number of times each textual statement is mentioned in the product information.

In example 18, the subject matter of examples 13-17 can optionally include wherein the normalizing the extracted textual statements comprises approximating a function F of two arguments which takes two of the extracted textual statements for the given product as input and computes their similarity as a number between 0 and 1.

In example 19, the subject matter of examples 13-18 can optionally include wherein the request comprises a request for a comparison between two of the products; the determining the one or more statements comprises identifying statements corresponding to the two products, the statements corresponding to the two products relating to one or more features of the two products; and the causing presentation of the one or more statements comprises providing comparative information comparing the one or more features of the two products Example 20 is a machine-storage medium for providing natural language conversational assistances using extracted guidance knowledge. The machine-storage medium configures one or more processors to perform operations comprising initiating, by a machine agent, an interactive natural language conversation between a user and the machine agent to provide the user with guidance on one or more products; receiving, via an interface by the machine agent, a request for information for the one or more products, the request comprising a natural language question inputted by the user during the interactive natural language conversation; in response to receiving the request, accessing, by the machine agent from a product knowledge database, textual statements about features of the one or more products, the textual statements obtained by a machine-based offline knowledge extraction process that extracts the textual statements from product information of the one or more products; based on the accessed textual statements about features of the one or more products, and an overall empirical utility of each of the accessed textual statements, determining, by the machine agent, one or more statements of the accessed textual statements to convey to the user; and causing, by the machine agent, presentation of the one or more statements as a natural language response to the user.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   initiating, by a machine agent, an interactive natural language conversation between a user and the machine agent to provide the user with guidance on one or more products;
   receiving, via an interface of the machine agent, a request for information that compares a pair of products, the request comprising a natural language question inputted by the user during the interactive natural language conversation;
   in response to receiving the request, accessing, by the machine agent from a product knowledge database, textual statements about one or more features corresponding to the pair of products, the textual statements obtained by a machine-based offline knowledge extraction process that extracts the textual statements from product information of one or more of the pair of products and at least one product review of one or more of the pair of products;
   based on the accessed textual statements and an overall empirical utility of each of the accessed textual statements estimated using past machine agent conversations with multiple users over a period of time, determining, by a hardware processor of the machine agent, one or more statements comparing the one or more features between the pair of products to convey to the user, the overall empirical utility of each of the accessed textual statements quantifying a likelihood of communicating a corresponding accessed textual statement of the accessed textual statements resulting in product purchase; and
   causing, by the machine agent, presentation of the one or more statements comparing the one or more features between the pair of products as a natural language response to the user.

2. The method of claim 1, wherein the determining comprises using a Q-learning algorithm, wherein a reward of the Q-learning algorithm is unknown.

3. The method of claim 2, further comprising estimating the reward based on one or more of the overall empirical utility of each of the accessed textual statements, support of each of the accessed textual statements as computed by the machine-based offline knowledge extraction process, knowledge about any known user preferences, an extrinsic factor based on marketplace utility metrics, a duration of the conversation, or durations of previous conversations with the user.

4. The method of claim 1, further comprising prompting feedback from the user during the interactive natural language conversation regarding a product previously purchased by the user, the feedback comprising specific features of the previously purchased product or strengths and weaknesses of the previously purchased product, the feedback being stored for later processing by the machine-based offline knowledge extraction process.

5. The method of claim 4, wherein the prompting the feedback comprises asking a second natural language question by the machine agent to the user during the interactive natural language conversation regarding the previously purchased product.

6. The method of claim 1 further comprising generating the product knowledge database, the generating the product knowledge database comprising:
- extracting the textual statements about product features from the product information;
- normalizing the extracted textual statements across the product information of a given product;
- based on the normalizing, computing polarity of the extracted textual statements;
- computing support of the extracted textual statements; and
- storing the extracted textual statements, corresponding polarity, and corresponding support in the product knowledge database.

7. The method of claim 6, wherein the computing support of the extracted textual statements comprises implementing a counter to measure a number of times each textual statement is mentioned in the product information.

8. The method of claim 6, wherein the normalizing the extracted textual statements comprises approximating a function F of two arguments which takes two of the extracted textual statements for the given product as input and computes their similarity as a number between 0 and 1.

9. The method of claim 6, wherein the determining is further based on the polarity and the support of each of the extracted textual statements.

10. The method of claim 1, wherein:
- the overall empirical utility of each of the accessed textual statements quantifies how likely communicating the corresponding accessed textual statement is to result in a purchase of a specific product; and
- the overall empirical utility of each of the accessed textual statements is estimated by the machine agent based on the past conversations with multiple users over the period of time.

11. The method of claim 1, further comprising accessing, by the machine agent, a user knowledge database of user preferences for the user requesting guidance on the one or more products, wherein the determining the one or more statements is further based on the user preferences for the user requesting guidance.

12. The method of claim 1, wherein causing presentation of the one or more statements comparing the one or more features between the pair of products further comprises:
- causing presentation of a first statement for a first feature of a first product of the pair of products and a second statement for the first feature of a second product of the pair of products.

13. The method of claim 1, wherein the one or more statements comparing the one or more features between the pair of products are determined based at least in part on the overall empirical utility of each textual statement accessed for the pair of products.

14. A system comprising:
- one or more hardware processors; and
- a memory storing instructions that, when executed by the one or more hardware processors, causes the one or more hardware processors to perform operations comprising:
  - receiving, via an interface of a machine agent, a request for information that compares a pair of products, the request comprising a natural language question inputted by a user during an interactive natural language conversation;
  - in response to receiving the request, accessing, by the machine agent from a product knowledge database, textual statements about one or more features corresponding to the pair of products, the textual statements obtained by a machine-based offline knowledge extraction process that extracts the textual statements from product information of one or more of the pair of products and at least one product review of one or more of the pair of products;
  - based on the accessed textual statements and an overall empirical utility of each of the accessed textual statements estimated using past machine agent conversations with multiple users over a period of time, determining, by a hardware processor of the machine agent, one or more statements comparing the one or more features between the pair of products to convey to the user, the overall empirical utility of each of the accessed textual statements quantifying a likelihood of communicating a corresponding accessed textual statement of the accessed textual statements resulting in product purchase; and
  - causing, by the machine agent, presentation of the one or more statements comparing the one or more features between the pair of products as a natural language response to the user.

15. The system of claim 14, wherein the determining comprises using a Q-learning algorithm, wherein a reward of the Q-learning algorithm is unknown.

16. The system of claim 14, wherein the operations further comprise prompting feedback from the user during the interactive natural language conversation regarding a product previously purchased by the user, the feedback comprising specific features of the previously purchased product or strengths and weaknesses of the previously purchased product, the feedback being stored for later processing by the machine-based offline knowledge extraction process.

17. The system of claim 14, wherein the operations further comprise generating the product knowledge database, the generating the product knowledge database comprising:
- extracting the textual statements about product features from the product information;
- normalizing the extracted textual statements across the product information of a given product;
- based on the normalizing, computing polarity of the extracted textual statements;
- computing support of the extracted textual statements; and
- storing the extracted textual statements, corresponding polarity, and corresponding support in the product knowledge database.

18. The system of claim 17, wherein the computing support of the extracted textual statements comprises implementing a counter to measure a number of times each textual statement is mentioned in the product information.

19. The system of claim 17, wherein the normalizing the extracted textual statements comprises approximating a function F of two arguments which takes two of the extracted textual statements for the given product as input and computes their similarity as a number between 0 and 1.

20. A non-transitory machine-readable medium storing instructions that, when executed by one or more processors of a machine, cause the machine to perform operations comprising:

- initiating, by a machine agent, an interactive natural language conversation between a user and the machine agent to provide the user with guidance on one or more products;
- receiving, via an interface of the machine agent, a request for information that compares a pair of products, the request comprising a natural language question inputted by the user during the interactive natural language conversation;
- in response to receiving the request, accessing, by the machine agent from a product knowledge database, textual statements about one or more features corresponding to the pair of products, the textual statements obtained by a machine-based offline knowledge extraction process that extracts the textual statements from product information of one or more of the pair of products and at least one product review of one or more of the pair of products;
- based on the accessed textual statements and an overall empirical utility of each of the accessed textual statements estimated using past machine agent conversations with multiple users over a period of time, determining, by a hardware processor of the machine agent, one or more statements comparing the one or more features between the pair of products to convey to the user, the overall empirical utility of each of the accessed textual statements quantifying a likelihood of communicating a corresponding accessed textual statement of the accessed textual statements resulting in product purchase; and
- causing, by the machine agent, presentation of the one or more statements comparing the one or more features between the pair of products as a natural language response to the user.

* * * * *